(12) United States Patent
Dutta et al.

(10) Patent No.: US 12,358,837 B2
(45) Date of Patent: Jul. 15, 2025

(54) TOUGH GLASS COMPOSITE AND METHOD

(71) Applicant: CORNING INCORPORATED, Corning, NY (US)

(72) Inventors: Indrajit Dutta, Horseheads, NY (US); Nicholas James Smith, Port Matilda, PA (US)

(73) Assignee: CORNING INCORPORATED, Corning, NY (US)

(*) Notice: Subject to any disclaimer, the term of this patent is extended or adjusted under 35 U.S.C. 154(b) by 982 days.

(21) Appl. No.: 17/289,263

(22) PCT Filed: Oct. 25, 2019

(86) PCT No.: PCT/US2019/058011
§ 371 (c)(1),
(2) Date: Apr. 28, 2021

(87) PCT Pub. No.: WO2020/092142
PCT Pub. Date: May 7, 2020

(65) Prior Publication Data
US 2021/0395142 A1    Dec. 23, 2021

Related U.S. Application Data

(60) Provisional application No. 62/753,413, filed on Oct. 31, 2018.

(51) Int. Cl.
*B32B 15/04*   (2006.01)
*B32B 17/06*   (2006.01)
(Continued)

(52) U.S. Cl.
CPC ............ *C03C 23/009* (2013.01); *C03C 3/062* (2013.01); *C03C 3/083* (2013.01)

(58) Field of Classification Search
CPC ........................................ C03C 3/062
(Continued)

(56) References Cited

U.S. PATENT DOCUMENTS 3,811,855 A   5/1974   Carlson et al.
3,879,183 A   4/1975   Carlson
(Continued)

FOREIGN PATENT DOCUMENTS

CN   107001123 A   8/2017
EP   1433758 A1    6/2004
(Continued)

OTHER PUBLICATIONS

International Search Report and Written Opinion of the International Searching Authority; PCT/US2019/058011; dated Feb. 10, 2020; 9 pages; European Patent Office.
(Continued)

*Primary Examiner* — Lauren R Colgan
(74) *Attorney, Agent, or Firm* — Svetlana Z. Short

(57) ABSTRACT

Embodiments of a glass substrate including an alkali-containing bulk and an alkali-depleted surface layer, including a substantially homogenous composition with at least 51 mol % $Al_2O_3$ are disclosed. In some embodiments, the alkali-depleted surface layer includes about 0.5 atomic % alkali or less. The alkali-depleted surface layer can be substantially free of hydrogen and/or crystallites. Methods for forming a glass substrate with a modified surface layer are also provided.

17 Claims, 4 Drawing Sheets

(51) Int. Cl.
*C03C 3/062* (2006.01)
*C03C 3/083* (2006.01)
*C03C 23/00* (2006.01)

(58) Field of Classification Search
USPC .......................................... 428/426, 410, 428
See application file for complete search history.

(56) References Cited

U.S. PATENT DOCUMENTS

| | | | |
|---|---|---|---|
| 7,176,528 B2 | 2/2007 | Couillard et al. | |
| 7,197,896 B2 | 4/2007 | Celikkaya et al. | |
| 7,285,510 B2 | 10/2007 | Sakaguchi et al. | |
| 7,619,283 B2 | 11/2009 | Gadkaree | |
| 9,593,042 B2 * | 3/2017 | Hu | C03C 10/0027 |
| 10,472,271 B2 * | 11/2019 | Dutta | C03C 3/083 |
| 2004/0138044 A1 * | 7/2004 | Sakaguchi | G02F 1/3555 |
| | | | 501/69 |
| 2014/0120311 A1 | 5/2014 | Smith | |
| 2016/0159684 A1 | 6/2016 | Smith | |
| 2016/0340226 A1 * | 11/2016 | Dutta | C03C 23/009 |
| 2017/0305787 A1 | 10/2017 | Gomez et al. | |
| 2018/0327306 A1 * | 11/2018 | Paraillous | C03C 3/111 |
| 2021/0395137 A1 * | 12/2021 | Dutta | C03C 10/0009 |
| 2021/0395142 A1 * | 12/2021 | Dutta | C03C 23/008 |
| 2022/0017406 A1 * | 1/2022 | Goel | C03B 27/012 |

FOREIGN PATENT DOCUMENTS

| | | |
|---|---|---|
| EP | 2078705 A1 | 7/2009 |
| FR | 3043400 A1 | 5/2017 |
| JP | 2008-013434 A | 1/2008 |
| JP | 2008-094713 A | 4/2008 |
| WO | 2013/082246 A1 | 6/2013 |
| WO | 2016/054349 A1 | 4/2016 |
| WO | 2016/187266 A1 | 11/2016 |
| WO | 2017/081396 A1 | 5/2017 |
| WO | 2018/200898 A2 | 11/2018 |

OTHER PUBLICATIONS

Carlson et al., "Ion Depletion of Glass at a Blocking Anode: II, Properties of Ion-Depleted Glasses", In Journal of the American Ceramic Society, 1974, vol. 57, Issue 7, pp. 295-300.

Carlson, "Ion Depletion of Glass at a Blocking Anode: I, Theory and Experimental Results for Alkali Silicate Glasses", In Journal of the American Ceramic Society, 1974, vol. 57, Issue 7, pp. 291-294.

Dragic et al., "Sapphire-Derived All-Glass Optical Fibers", in Nat Photon 6(9), 2012, p. 1.

Rosales et al., "Crack-resistant Al2O3—SiO2 glasses", In Scientific Report 6, 2016, pp. 8.

Weber et al., "Structure of High Alumina Content Al2O3—SiO2 Composition Glasses", In ACS Publications, 2008, pp. 16726-16733.

Dussauze et al., "Thermal Poling of Optical Glasses: Mechanisms and Second-Order Optical Properties" In International Journal of Applied Glass Science, vol. 3, No. 4, 2012, pp. 309-320.

* cited by examiner

TOUGH GLASS COMPOSITE AND METHOD

CROSS-REFERENCE TO RELATED APPLICATIONS

This application claims the benefit of priority under 35 U.S.C. § 371 of International Application No. PCT/US2019/058011, filed on Oct. 25, 2019, which claims the benefit of priority under 35 U.S.C. § 119 of U.S. Provisional Application No. 62/753,413, filed Oct. 31, 2018, the content of which is incorporated herein by reference in its entirety.

BACKGROUND

The disclosure relates to glass substrates with a modified surface layer, and more particularly to glass substrates with a silica and alumina and alkali-containing bulk, and an alkali-depleted surface layer containing silica and alumina with at least 51 mol % alumina.

Certain high- $Al_2O_3$ compositions of binary $Al_2O_3$-$SiO_2$ glass exhibit very high crack resistance, particularly compositions with 51 mol % or greater $Al_2O_3$. Binary glasses in this composition range are extremely difficult to make from the melt, due to high melting temperatures and strong tendencies toward immiscibility and rapid crystallization.

For research involving glass in this general composition range, aerodynamic levitation has been used in place of traditional melting. It would be desirable to establish a more practical fabrication pathway, potentially useful at industrial scales, for production of binary $Al_2O_3$-$SiO_2$ glass comprising 51 mol % or greater $Al_2O_3$, and to provide articles with a surface layer having this compositions with resulting high crack resistance.

SUMMARY

Disclosed herein is a glass substrate comprising an alkali-containing bulk comprising Al2O3 and SiO2 and an alkali-depleted surface layer comprising Al2O3 and SiO2, wherein the alkali-depleted surface layer is substantially amorphous and has a substantially homogenous composition comprising a mol % Al2O3 of at least 51%. Also disclosed is a method forming a glass substrate with a modified surface layer, the method comprising providing a glass substrate comprising Al2O3 and SiO2 in a molar ratio of greater than 1:1 Al2O3 to SiO2 and a concentration of alkali, the glass substrate having a glass transition temperature (Tg), and reducing the concentration of alkali in the surface layer by subjecting the glass substrate to thermal poling treatment, at a temperature below Tg. A substrate of particular interest is one having compositional ratio(s) corresponding to mullite, that is, having a mol % ratio of $Al_2O_3$ to $SiO_2$ of about 3:2, or, in a binary composition, about 57 to 60% $Al_2O_3$, the rest $SiO_2$. Enhanced crack resistance has been shown in amorphous compositions of this type.

As used herein, the phrase "substantially homogeneous composition" refers to a composition that does not exhibit any phase separation or very little phase separation. As used herein, alkali means one or more alkali metals and alkaline earth metals and/or oxides thereof, and in particular, the alkali metals and alkaline earth metals and/or oxides thereof present in a substrate. As used herein, alkali-depleted, with reference to a surface layer of a substrate, means the surface layer comprises alkali in a concentration less than the concentration present in an alkali-containing bulk (or remainder) of the substrate. In some embodiments, the concentration of alkali in the alkali-depleted surface layer is about 0.5 atomic % or less. In such embodiments, in which the alkali concentration is about 0.5 atomic % or less (e.g., about 0.4 atomic % or less, about 0.3 atomic % or less, about 0.2 atomic % or less, about 0.1 atomic % or less, or about 0.05 atomic % or less, or in the range from about 0.05 atomic % to about 0.1 atomic %), the surface layer can be referred to as substantially alkali-free. Where the alkali concentration is less than about 0.05 atomic % or less, the surface layer can be referred to as alkali-free.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Reference will now be made in detail to various embodiment(s).

Figure 1:
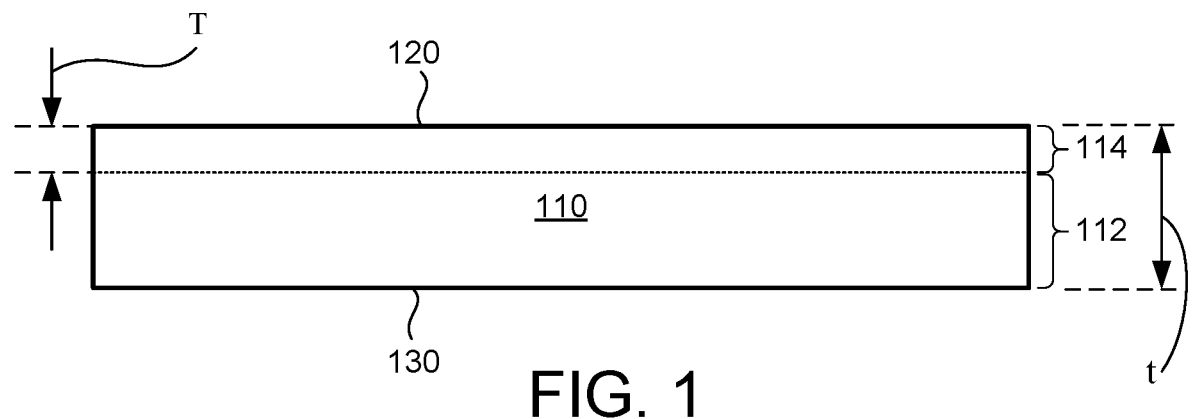
FIG. 1 is a side view of a glass substrate according to one or more embodiments.

As shown in FIG. 1, a first aspect of this disclosure pertains to a glass substrate 110 including an alkali-containing bulk 112 and an alkali-depleted surface layer 114. The alkali-containing bulk 112 can include one or more alkali-metal oxides selected from $Li_2O$, $Na_2O$, $K_2O$, $Rb_2O$ and $Cs_2O$, and one or more alkaline-earth metal oxides selected from BeO, MgO, CaO, SrO, BaO, and RaO.

In one or more embodiments, the alkali-depleted surface layer 114 can be substantially alkali-free or alkali free. The alkali-depleted surface layer 114 can be described as an aluminosilicate surface layer, exhibiting a composition that differs from the bulk 112, while exhibiting homogeneity in terms of composition and/or atomic structure within and throughout the surface layer. The alkali-depleted surface layer 114 is integral to the glass substrate 110 and is not a coating or an addition to the bulk 112.

In one or more embodiments, the glass substrate 110 can have a thickness t and the alkali-depleted surface layer can have a thickness T in the range from about 10 nm to about 10,000 nm, from about 10 nm to about 900 nm, from about 10 nm to about 800 nm, from about 10 nm to about 700 nm, from about 10 nm to about 600 nm, from about 10 nm to about 500 nm, from about 50 nm to about 1000 nm, from about 100 nm to about 1000 nm, from about 200 nm to about 1000 nm, from about 250 nm to about 1000 nm, from about 300 nm to about 1000 nm, from about 400 nm to about 1000 nm, or from about 500 nm to about 1000 nm. In some embodiments, thickness t can be in the range from about 0.1 mm to about 3.0 mm (e.g., from about 0.3 mm to about 3 mm, from about 0.4 mm to about 3 mm, from about 0.5 mm to about 3 mm, from about 0.55 mm to about 3 mm, from about 0.7 mm to about 3 mm, from about 1 mm to about 3 mm, from about 0.1 mm to about 2 mm, from about 0.1 mm to about 1.5 mm, from about 0.1 mm to about 1 mm, from about 0.1 mm to about 0.7 mm, from about 0.1 mm to about 0.55 mm, from about 0.1 mm to about 0.5 mm, from about 0.1 mm to about 0.4 mm, from about 0.3 mm to about 0.7 mm, or from about 0.3 mm to about 0.55 mm).

In one or more embodiments, the alkali-depleted surface layer 114 has substantially homogenous composition. In some embodiments, the composition of the alkali-depleted surface layer 114 is substantially the same along the thickness T of the surface layer. In other embodiments, the composition of the alkali-depleted surface layer 114 is substantially the same along its entire volume. As used herein, the phrase "homogenous composition" refers to a composition that is not phase separated or does not include portions with a composition differing from other portions.

In one or more embodiments, the alkali-depleted surface layer 114 can be substantially free of crystallites or is substantially amorphous. For example, in some embodiments, the alkali-depleted surface layer 114 includes less than about 1 volume % crystallites.

In one or more embodiments, the alkali-depleted surface layer 114 is substantially free of hydrogen. Such hydrogen can be present in the form of $H^+$, $H_3O^+$, $H_2O$ or combinations therefrom. In some embodiments, the alkali-depleted surface layer 114 includes about 0.1 atomic % hydrogen or less (e.g., about 0.08 atomic % hydrogen or less, about 0.06 atomic % hydrogen or less, about 0.05 atomic % hydrogen or less, about 0.04 atomic % hydrogen or less, about 0.02 atomic % hydrogen or less, or about 0.01 atomic % hydrogen or less).

In embodiments, the alkali-depleted surface layer 114 comprises $Al_2O_3$ of at least 51%. In some embodiments, the alkali-depleted surface layer comprises $Al_2O_3$ in the range from 51 mol % to 90 mol %. In some embodiments, the amount of $Al_2O_3$ can be in the range from 51 mol % to about 80 mol %, from 55 mol % to 70 mol %, from 55 mol % to 65 mol %, from 56 mol % to 62 mol %, or from 57 mol % to 60 mol %.

In one or more specific embodiments, the alkali-depleted surface layer comprises a binary $Al_2O_3$-$SiO_2$ composition, though other non-alkali components can be included.

The alkali-depleted surface layer 114, particularly as the composition of the layer 114 approaches the mullite compositional stoichiometry of around 57 mol % to 60 mol % $Al_2O_3$, can exhibit a cracking probability of 50% or less for a Vicker's indentation load of 10N, and/or for a Vicker's indentation load of 30N, and/or even for a Vicker's indentation load of 50N. Such high cracking resistance in a transparent substrate is desirable.

A method of forming a glass substrate with a modified surface layer having at least 51 mol % $Al_2O_3$ includes providing a glass substrate 110 comprising a concentration of alkali, and $Al_2O_3$ and $SiO_2$ in a mol % ratio of greater than 1:1 $Al_2O_3$ to $SiO_2$, and reducing the concentration of alkali in a surface layer 114 of the substrate. In one or more embodiments, the resulting surface layer 114 with reduced concentration of alkali comprises a substantially homogenous composition.

In one or more embodiments, reducing the concentration of alkali in the surface layer 114 includes subjecting the glass substrate 110 to thermal poling.

Prior to thermal poling treatment, the surface(s) of the glass substrate can cleaned or treated to remove typical contamination that can accumulate after forming, storage and shipping. Alternatively, the glass substrate can be subjected to treatment immediately after glass forming to eliminate the accumulation of contamination.

Figure 2:
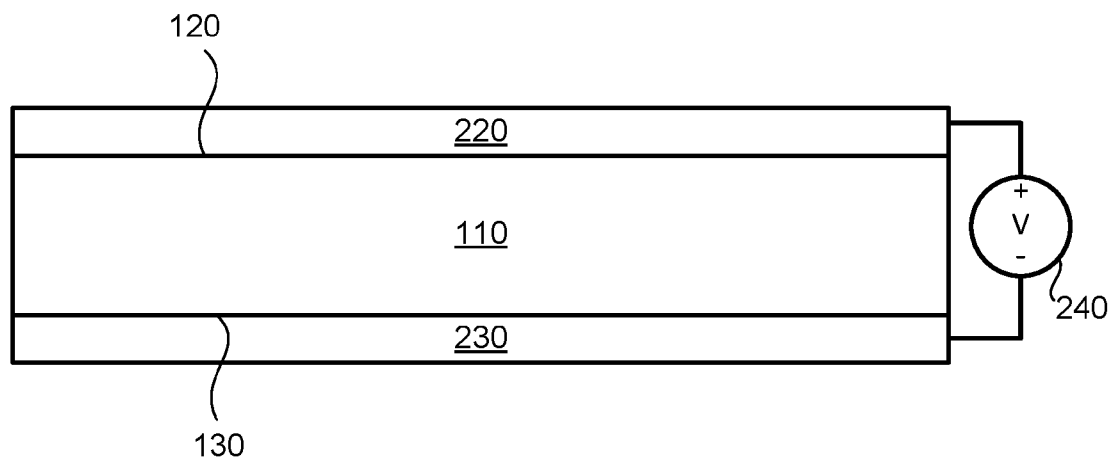
FIG. 2 is a side view of the glass substrate undergoing thermal poling according to one or more embodiments.

As shown in diagrammatic side view in FIG. 2, thermal poling can include contacting the glass substrate 110 with an electrode, such as contacting the glass substrate with an anode 220 and a cathode 230. The anode can be in contact with a first surface 120 of the glass substrate 110 and the cathode can be in contact with a second surface 130 of the glass substrate 110. The cathode 220 and the anode 230 can be used to apply an electrical potential difference 240 to the glass substrate 110 such that the first surface 120 is subjected to positive DC bias relative to the second surface 130.

In one or more embodiments, the material of the anode 220 is substantially more conductive than the glass substrate 110 at a poling temperature, in order to provide field uniformity over the first surface 120. It is also desirable that the anodic electrode material be relatively oxidation resistant to minimize the formation of an interfacial oxide compound that could cause sticking of the glass substrate 110 to the anode 120. Exemplary anode materials include noble metals (e.g., Au, Pt, Pd, etc.) or oxidation-resistant, conductive films (e.g. TiN, TiAlN).

The material of cathode 230 can also be conductive to likewise help provide for field uniformity over the first surface 120 of the glass substrate 110. Exemplary materials for the cathodic electrode material include materials that can accept alkali ions from the glass, such as graphite. In some embodiments, a physical cathode 230 is not always necessary to be brought into contact with the second surface 130 of the glass substrate 110, due to surface discharge from the second surface 130.

In one or more embodiments, the electrode(s) 220, 230 are separate components that are brought into contact with the glass substrate 110, and thus can be separated after processing without complex removal steps. Electrodes can generally comprise a bulk material, but can take the form of a thin film, for example, a conductive thin film that is deposited on the glass to serve as an electrode.

For instance, in some embodiments, the anode 220 can generally cover all or only part of the first surface 120, and can be intermittent or patterned as desired. Patterning can be achieved by any of a variety of methods, such as lithographic techniques, mechanical machining, or otherwise.

The curvature and/or flatness of the glass substrate 110 and the anode 120 should ideally be matched to provide for reasonably intimate contact at the interface over the first surface 120. However, even if initial contact is not intimate, the electrostatic charge at the interface when voltage is applied will tend to pull the two surfaces into intimate contact as an inherent part of the method.

Thermal poling can include applying an electric potential (such as voltage 240) to the glass substrate 110 such that the anode 220 is positively-biased relative to the glass substrate 110, to induce alkali depletion at the first surface 120 of the glass. The electric potential can be DC or DC-biased AC. Prior to applying the electric potential, the method can include heating the glass substrate and electrode (i.e., the stack including an anode/glass/cathode) to a temperature below Tg. In some embodiments, the glass substrate and electrode can be heated to a process temperature in the range from about 25° C. to about Tg, the glass transition temperature of the glass substrate 110, or from about 100° C. to about 300° C. In some embodiments, equilibrium at the desired process temperature can be useful in thermal poling to ensure temperature uniformity.

In one or more embodiments, the thermal poling treatment includes applying an electric potential (voltage) in the range from about 100 volts to about 10,000 volts (e.g., from about 100 volts to about 1000 volts) to the glass substrate for a duration in the range from about 1 minute to about 6 hours (e.g., from about 5 minutes to about 60 minutes, from about 15 minutes to about 30 minutes). It should be noted that thermal poling treatment times and potentials can vary depending on glass composition. In some embodiments, the glass substrate can be subjected to thermal poling under vacuum, in an inert gas environment (e.g., dry $N_2$), or a permeable gas environment (e.g., He).

Electric potential can be applied in either one or more discrete steps to achieve a maximum desired value, or ramped (or increased) in a controlled/current-limited manner up to the process voltage. Such potential-varying approaches can have an advantage in avoiding thermal dielectric breakdown with the passage of too much current through the glass, especially with low-resistivity glasses, allowing for higher final poling voltages and possibly a thicker surface layer 114. Alternatively, as breakdown strength varies with glass composition, surface condition, and ambient temperature, an "instant-on" strategy for applying voltage can also be tolerated under some conditions, and could be desired for convenience.

After thermal poling treatment, the glass substrate can be cooled to a temperature in the range from about 25° C. to about 80° C. for subsequent handling. The electric potential can be removed prior to cooling or after cooling.

In one or more embodiments, apparatus suitable for performing poling treatments can include any system that can simultaneously maintain heat and voltage to the glass/electrode stack in a controlled manner while avoiding practical problems such as leakage current paths or arcing. In one or more embodiments, the apparatus also provides control of the process atmosphere (e.g., under vacuum, in an inert gas environment such as dry $N_2$, or permeable gas environment) can minimize atmosphere effects and/or occluded gas at the interface.

The glass substrate 110, prior to thermal poling treatment, and the resulting post-treatment alkali-containing bulk 112 can include a variety of glass compositions. Such glass compositions used in the glass substrate 110 prior to thermal poling treatment (and present in the alkali-containing bulk after thermal poling treatment) can be referred to herein as a "precursor" glass or glass composition. The precursor compositions can range from simple alkali or alkaline-earth silicates, aluminosilicates, borosilicates, or boroaluminosilicates, to more complex multicomponent glasses able to form an altered surface layer by the process of thermal poling. In one embodiment, the alkali-containing bulk can show signs of nanoscale phase-separation but, when subjected to thermal poling, the alkali-depleted surface layer comprises a single-phase.

Figure 3:
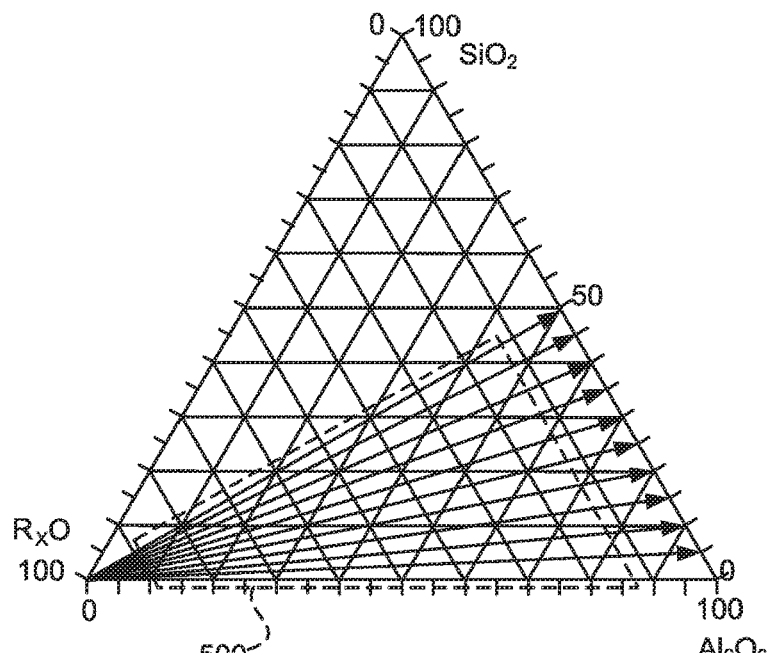
FIG. 3 is a ternary diagram in units of mol % illustrating potential precursor glass compositions according to embodiments, with arrows illustrating the compositional effects in a surface layer of the substrate of thermal poling.

As shown in the ternary composition diagram of FIG. 3, precursor compositions fall within the region 500 (dashed line), containing $Al_2O_3$ and $SiO_2$ in a ratio of at least (just) greater than 1:1 mol % $Al_2O_3$ to $SiO_2$, along with an alkali component, such as an alkali metal oxide, an alkaline earth oxide, or any combinations of either. The alkali component is represented in the diagram as $R_xO$. Poling shifts the alkali component out of the alkali depleted layer 114, which shifts the composition of the layer 114 along the path(s) indicated by the arrows in FIG. 3, to (or very close to) the rightward edge of the diagram, representing a binary composition of $Al_2O_3$ and $SiO_2$.

Figure 4:
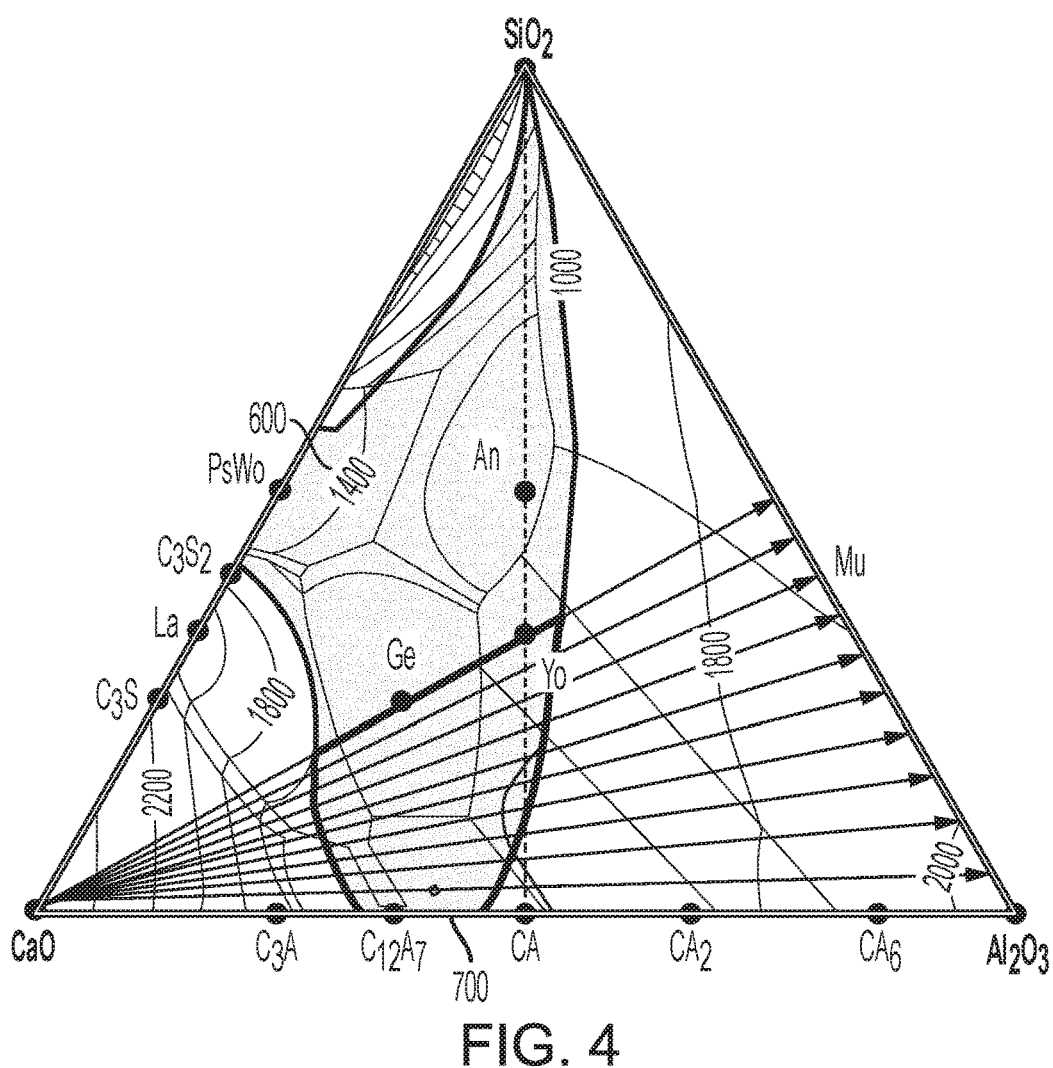
FIG. 4 is a ternary diagram in units of mol % of a $CaO$-$Al_2O_3$-$SiO_2$ system, showing glass the forming range for typical cooling rates, illustrating potential precursor glass compositions according to embodiments, again with arrows illustrating the compositional effects in a surface layer of the substrate of thermal poling.

Those of skill in the art understand how to select glass-forming compositions within the region 500 of FIG. 3. An example is shown in FIG. 4, which is a ternary diagram of a $CaO-Al_2O_3-SiO_2$ system. The shaded glass forming range 600 for typical cooling rates extends all the way to binary compositions of $CaO-Al_2O_3$ at the lower edge of the diagram, meaning that compositions with extreme $Al_2O_3$-to-$SiO_2$ mol % ratios are formable. Region 700, the overlap of regions 500 (FIG. 3) and 600 contains example precursor compositions. The arrows again illustrate the compositional effects in the surface layer 114 of the thermal poling.

Figure 5:
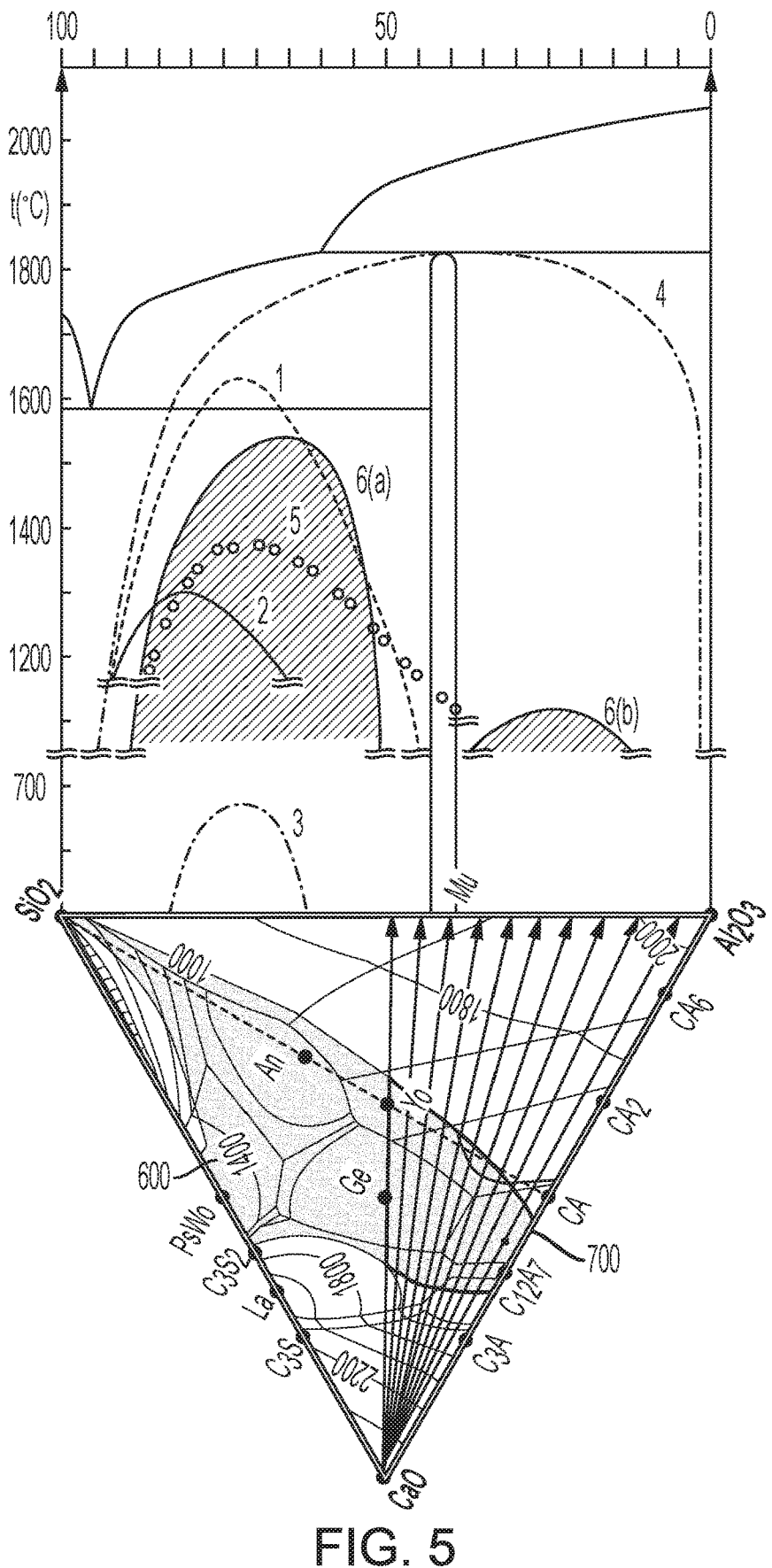
FIG. 5 is the ternary diagram in units of mol % of FIG. 4 rotated 60 degrees leftward and matched to a diagram of immiscible phases in the binary $SiO_2$-$Al_2O_3$ system, illustrating how glass compositions of $SiO_2$-$Al_2O_3$ with $Al_2O_3$ mol % above 50 are achievable according method embodiments of the present disclosure, but not through practical melting and cooling processes.

FIG. 5 is the ternary diagram of FIG. 4, rotated 60 degrees leftward, and matched to a diagram of immiscible phases in the binary $SiO_2-Al_2O_3$ system. (Mol % $SiO_2$ is marked at the top of the diagram.) Binary compositions above 51 mol % $Al_2O_3$ (or below 49 mol % $SiO_2$) are almost impossible to form through normal melting techniques, as suggested by the overlapping immiscibility curves at the top of the figure. However, compositions in these ranges can be created in the alkali depleted layer 114, as illustrated by the arrows in the lower part of the figure.

Figure 6:
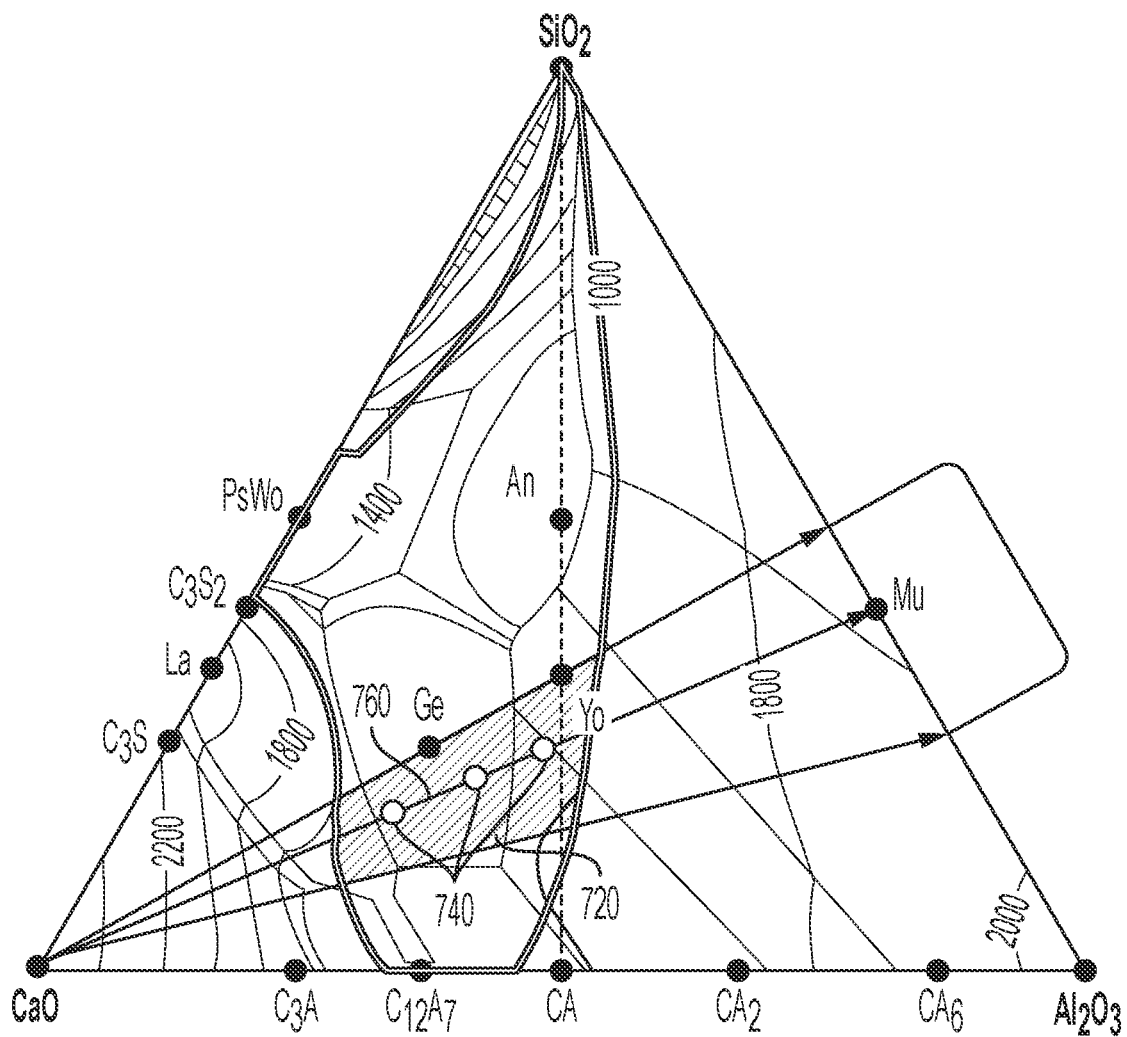
FIG. 6 is the ternary diagram of FIG. 4 showing a region of precursors for a final $SiO_2$-$Al_2O_3$ ratio at or near that of Mullite.

Of particular interest is the compositional ratio(s) corresponding to mullite, having a mol % ratio of $Al_2O_3$ to $SiO_2$ of about 3:2, or, in a binary composition, about 57 to 60% $Al_2O_3$, the rest $SiO_2$. A reduced region 720, a region of precursors for mullite-like depleted layer compositions, is shown by the cross-hatches in FIG. 6. Precursor compositions, such as compositions 740, can be selected along the line 760 representing the mullite ratio of $Al_2O_3$ to $SiO_2$.

Fining agents can be included in the precursor glass compositions described herein such as $SnO_2$ and other known fining agents.

In one or more embodiments, the precursor glass composition can be substantially free of boron. For example, the precursor glass composition and/or the glass substrate after thermal poling treatment can include less than about 1 mol %, or less than about 0.1 mol % $B_2O_3$ or boron in any state.

After thermal poling treatment, the glass substrates described herein can exhibit an elastic modulus (or Young's modulus) in the range from about 30 GPa to about 120 GPa. In some instances, the elastic modulus of the substrate can be in the range from about 30 GPa to about 110 GPa, from about 30 GPa to about 100 GPa, from about 30 GPa to about 90 GPa, from about 30 GPa to about 80 GPa, from about 30 GPa to about 70 GPa, from about 40 GPa to about 120 GPa, from about 50 GPa to about 120 GPa, from about 60 GPa to about 120 GPa, from about 70 GPa to about 120 GPa, and all ranges and sub-ranges therebetween.

In one or more embodiments, the glass substrate can be strengthened or non-strengthened. In some embodiments, the thermal poling can be performed on strengthened glass substrates such that the alkali-depleted surface layer is formed on top of a compressive stress layer in the strengthened glass substrate.

The glass substrate can be substantially planar or sheet-like, although other embodiments can utilize a curved or otherwise shaped or sculpted substrate. The glass substrate can be substantially optically clear, transparent and free from light scattering. In such embodiments, the glass substrate can exhibit an average total transmittance over the optical wavelength regime of about 85% or greater, about 86% or greater, about 87% or greater, about 88% or greater, about 89% or greater, about 90% or greater, about 91% or greater or about 92% or greater.

Additionally or alternatively, the physical thickness t of the glass substrate can vary along one or more of its dimensions for aesthetic and/or functional reasons. For example, the edges of the glass substrate can be thicker as compared to more central regions of the glass substrate. The length, width and physical thickness dimensions of the glass substrate can also vary according to the application or use.

The glass substrate can be provided using various forming methods can include float glass processes and down-draw processes such as fusion draw and slot draw.

The resulting glass substrates including the alkali-containing bulk and alkali-depleted surface layer described herein exhibit improved crack (crack initiation) resistance.

The absence of mobile alkali or other network-modifiers means there are very limited pathways for ionic hopping conduction, translating to inhibited diffusion (aka diffusion barrier) properties. Likewise, the absence of mobile alkali or other network-modifiers will increase resistance to corrosion in chemistries that operate primarily by an ion-exchange mechanism (e.g. $H^+/H_3O^+ \leftrightarrow Na^+$), a prime example being acidic chemistries.

In one or more embodiments, the alkali-depleted surface layer comprises a layer refractive index that is less than the refractive index of the alkali-containing bulk. For example, the alkali-containing layer can have a refractive index that is in the range from about 1.4 to about 1.5 at a wavelength of about 550 nm. Such embodiments can exhibit an anti-reflection effect due to the lower refractive index alkali-containing layer.

In some embodiments, the glass substrate having an alkali-containing bulk and an alkali-depleted surface layer can exhibit increased elastic modulus as compared to the alkali-containing bulk (or the glass substrate before the alkali-depleted surface layer is formed). For example, the glass substrate can have an elastic modulus that is about 10% greater than the elastic modulus of the alkali-containing bulk (or the glass substrate before the alkali-depleted surface layer is formed). For example, in some embodiments, the hardness of the glass substrates described herein is also greater than the hardness of the alkali-containing bulk. For example, the hardness of the glass substrate can be about 10% or even 20% greater than the hardness of the alkali-containing bulk (or the glass substrate before the alkali-depleted surface layer is formed).

In some embodiments, the alkali-depleted surface layers also block ion diffusion either into the glass substrate or from the alkali-containing bulk to the alkali-depleted surface layer.

The glass substrates described herein can exhibit an increased chemical durability in terms of resistance to dissolution in acid, water or base. In some examples, the glass substrate exhibits a decrease in dissolution rates in acid, water or base of about 1.5 times or more or even about 10 times or more.

It will be apparent to those skilled in the art that various modifications and variations can be made without departing from the spirit or scope of the disclosure.

What is claimed is:

What is claimed is:
1. A glass substrate comprising:
    an alkali-containing bulk comprising $Al_2O_3$ and $SiO_2$; and
    an alkali-depleted surface layer comprising $Al_2O_3$ and $SiO_2$,
    wherein:
        the alkali-depleted surface layer is substantially amorphous such that the alkali-depleted surface layer is less than 1% crystalline phase by volume;
        the alkali-depleted surface layer has a substantially homogenous composition comprising 57 mol % or more $Al_2O_3$;
        the alkali-depleted surface layer exhibits a cracking probability of 50% or less for a Vicker's indentation load of 10N; and
        the alkali-depleted surface layer is formed by thermal poling of the glass substrate.
2. The glass substrate according to claim 1, wherein the alkali-depleted surface layer comprises about 0.5 atomic % alkali or less.
3. The glass substrate according to claim 1, wherein the alkali-containing bulk comprises an alkali-metal oxide or an alkaline-earth oxide selected from $Li_2O$, $Na_2O$, $K_2O$, $Rb_2O$, $Cs_2O$, MgO, CaO, SrO, and BaO, and combinations thereof.
4. The glass substrate according to claim 1 further comprising one or more mobile transition metal oxides.
5. The glass substrate according to claim 4 comprising $Ag_2O$.
6. The glass substrate according to claim 1, wherein the alkali-depleted surface layer comprises $Al_2O_3$ in the range from 57 mol % to 90 mol %.
7. The glass substrate according to claim 1, wherein the alkali-depleted surface layer comprises $Al_2O_3$ in the range from 57 mol % to 80 mol %.
8. The glass substrate according to claim 1, wherein the alkali-depleted surface layer comprises $Al_2O_3$ in the range from 57 mol % to 70 mol %.
9. The glass substrate according to claim 1, wherein the alkali-depleted surface layer comprises $Al_2O_3$ in the range from 57 mol % to 65 mol %.
10. The glass substrate according to claim 1, wherein the alkali-depleted surface layer comprises a binary $Al_2O_3$-$SiO_2$ composition.
11. The glass substrate according to claim 1, wherein the alkali-depleted surface layer has a thickness in the range from about 10 nm to about 10,000 nm.
12. The glass substrate according to claim 1, wherein the alkali-depleted surface layer has a thickness in the range from about 10 nm to about 1200 nm.
13. The glass substrate according to claim 1, wherein the alkali-depleted surface layer has a thickness in the range from about 10 nm to about 600 nm.
14. The glass substrate according to claim 1, wherein the alkali-depleted surface layer exhibits a cracking probability of 50% or less for a Vicker's indentation load of 30N.
15. The glass substrate according to claim 1, wherein the alkali-depleted surface layer exhibits a cracking probability of 50% or less for a Vicker's indentation load of 50N.

16. The glass substrate according to claim 1, wherein the alkali-depleted surface layer has less than 0.1 atomic % of H.

17. The glass substrate according to claim 1, wherein the alkali-depleted surface layer comprises 0.5 atomic % H or less.

* * * * *